(12) United States Patent
Ishikawa

(10) Patent No.: US 8,218,885 B2
(45) Date of Patent: Jul. 10, 2012

(54) APPARATUS AND METHOD FOR IMAGE DATA COMPRESSION

(75) Inventor: Takashi Ishikawa, Hachioji (JP)

(73) Assignee: Olympus Imaging Corp. (JP)

( * ) Notice: Subject to any disclaimer, the term of this patent is extended or adjusted under 35 U.S.C. 154(b) by 1105 days.

(21) Appl. No.: 12/113,421

(22) Filed: May 1, 2008

(65) Prior Publication Data

US 2008/0285871 A1  Nov. 20, 2008

(30) Foreign Application Priority Data

May 16, 2007  (JP) ................. 2007-130261

(51) Int. Cl.
*G06K 9/36* (2006.01)
(52) U.S. Cl. ............... 382/234; 382/244; 382/248
(58) Field of Classification Search ........... 382/232–253
See application file for complete search history.

(56) References Cited

U.S. PATENT DOCUMENTS

| | | | | |
|---|---|---|---|---|
| 6,031,938 A * | 2/2000 | Kajiwara | .................... | 382/239 |
| 6,061,474 A * | 5/2000 | Kajiwara et al. | ............. | 382/238 |
| 6,256,413 B1 * | 7/2001 | Hirabayashi | .................. | 382/232 |
| 7,308,148 B2 * | 12/2007 | Napper | ........................ | 382/238 |
| 7,412,104 B2 * | 8/2008 | Talapov et al. | ............... | 382/244 |
| 7,429,938 B1 * | 9/2008 | Corndorf | ........................ | 341/67 |
| 7,570,827 B2 * | 8/2009 | Yang et al. | .................... | 382/245 |
| 7,706,011 B2 * | 4/2010 | Sasaki | .......................... | 358/1.15 |
| 2003/0174888 A1 * | 9/2003 | Ferguson | ....................... | 382/170 |
| 2006/0045362 A1 * | 3/2006 | Ito et al. | ........................ | 382/232 |
| 2007/0223824 A1 * | 9/2007 | Kato et al. | ..................... | 382/232 |
| 2008/0285866 A1 * | 11/2008 | Ishikawa | ....................... | 382/232 |
| 2008/0291295 A1 * | 11/2008 | Kato et al. | ............... | 348/231.99 |
| 2009/0086817 A1 * | 4/2009 | Matsuoka et al. | ........ | 375/240.12 |
| 2009/0317012 A1 * | 12/2009 | Yang et al. | ..................... | 382/245 |

FOREIGN PATENT DOCUMENTS

| | | |
|---|---|---|
| EP | 1 761 067 | 3/2007 |
| JP | 2006-67117 | 3/2006 |
| WO | WO 2007/026855 | 3/2007 |
| WO | WO 2007026855 A1 * | 3/2007 |

OTHER PUBLICATIONS

Umbaugh Computer Imaging pp. 489-495 Copyright 2005 CRC Press.*

* cited by examiner

*Primary Examiner* — Bhavesh Mehta
*Assistant Examiner* — Sean Motsinger
(74) *Attorney, Agent, or Firm* — Ostrolenk Faber LLP

(57) ABSTRACT

There are provided an image processing section for carrying out processing to detect high frequency components of an image, a calculating section for calculating feature data representing distribution of frequency of appearances of high frequency components, a compression parameter setting section for setting compression parameters based on feature data, and a RAW compression processing section for carrying out RAW compression processing for image data based on compression parameters. Together with data size of lossless compression data, such as RAW data, not becoming large, the processing to do this is carried out in a short time.

7 Claims, 5 Drawing Sheets

| cord word | code length (bit) | category (Huffman Table 1) | category (Huffman Table 2) |
|---|---|---|---|
| 00 | 2 | 3 | 11 |
| 01 | 2 | 2 | 10 |
| 100 | 3 | 4 | 9 |
| 101 | 3 | 1 | 8 |
| 1100 | 4 | 5 | 7 |
| 1101 | 4 | 0 | 6 |
| 1110 | 5 | 6 | 5 |
| 11110 | 6 | 7 | 4 |
| 111110 | 7 | 9 | 3 |
| 1111110 | 8 | 8 | 2 |
| 11111110 | 9 | 10 | 1 |
| 111111110 | 10 | 11 | 0 |

| 0 | -1 | 0 |
|---|---|---|
| -1 | 4 | -1 |
| 0 | -1 | 0 |

| 0 | -1 | 0 |
|---|---|---|
| -1 | 0 | 1 |
| 0 | 1 | 0 |

APPARATUS AND METHOD FOR IMAGE DATA COMPRESSION

Benefit is claimed, under 35 U.S.C. §119, to the filing date of prior Japanese Patent Application No. 2007-130261, filed on May 16, 2007. This application is expressly incorporated herein by reference. The scope of the present invention is not limited to any requirements of the specific embodiments described in the application.

BACKGROUND OF THE INVENTION

1. Field of the Invention

The present invention relates to an image data compression device, and to an image data compression method and program.

2. Description of the Related Art

In some imaging devices, such as single lens reflex digital cameras, an exposure mode is provided where it is possible to simultaneously store RAW image data that has been subjected to lossless compression and JPEG data that has been subjected to lossy compression. The data size at the time of lossless conversion, as with this RAW image data, is generally large compared to a lossy compression method such as JPEG, and there is a problem with data size becoming larger than the input RAW image data.

As a method for ensuring that the data size of image data does not become any bigger than a specified size, Japanese Unexamined Patent Application No. 2006-67117 (laid-open Mar. 9, 2006) discloses a method of, when a code amount with lossy compression exceeds a specified value, updating parameters, and reflecting in lossless compression parameters while recreating the lossy compression data.

SUMMARY OF THE INVENTION

The present invention has been conceived in view of the above described situation, and an object of the invention is to provide an image data compression device, and image data compression method and program, in which the data size of lossless compression data, such as RAW data, does not become large, and at the same time the processing time for carrying out processing to achieve this is not prolonged.

The image data compression device of the present invention comprises: a lossy compression processing section for performing lossy compression of image data; an image processing section, arranged between an input section for the image data and the lossy compression processing section, for performing image processing including calculation of feature parameters for the lossy compression processing; a parameter setting section for setting parameters for lossless compression processing based on the feature parameters, and a lossless compression processing section that is input with the image data and the parameters, and performs lossless compression processing.

DETAILED DESCRIPTION OF THE PREFERRED EMBODIMENTS

In the following, one preferred embodiment using a digital single lens reflex camera adopting the present invention will be described using the drawings. A digital single lens reflex camera relating to this embodiment carries out various image processing such as compression processing on image data and then stores the results in an image storage medium, once the composition of a subject has been determined and the subject image taken. Also, at the time of image storage, an exposure mode is selectable that performs lossy compression processing using JPEG and lossless compression processing using RAW, and stores image data resulting from compression processing of both the lossy compression and the lossless compression.

Figure 1:
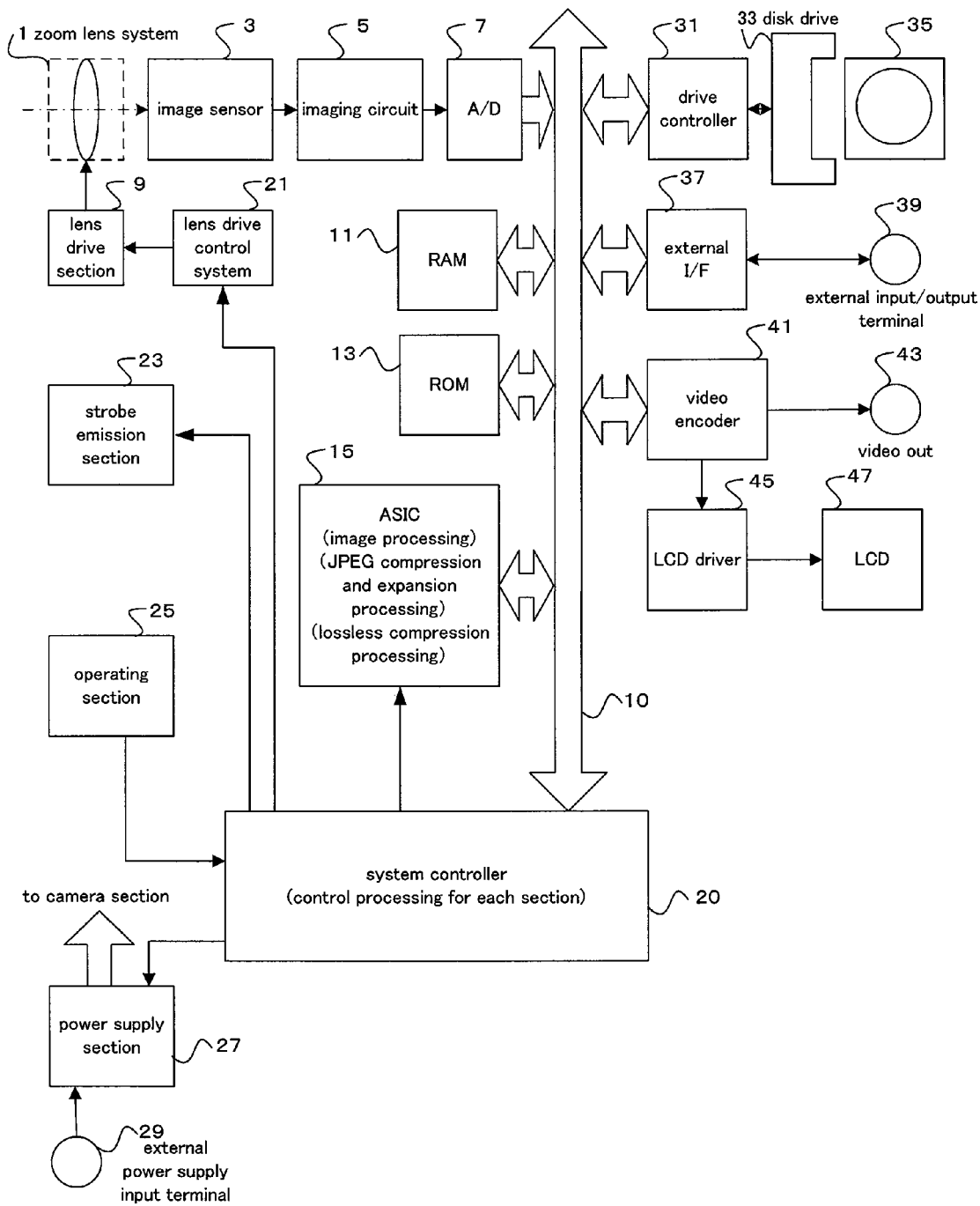
FIG. 1 is a block diagram showing the electrical structure of a digital single lens reflex camera relating to one embodiment of the present invention.

The electrical structure of the digital single lens reflex camera of this embodiment will be described using FIG. 1. A zoom lens system 1 for capturing the subject image is fitted to a camera body. The focal length of this zoom lens system 1 is variable, and drive for adjusting the focal length and the focus position of the zoom lens system 1 is carried out using a lens drive section 9 provided with a motor etc.

An image sensor 3 is arranged on the optical axis of the zoom lens system 1, close to the position where the subject image is formed. This image sensor 3 photoelectrically converts the subject image and outputs an image signal. Output of the image sensor 3 is connected to an imaging circuit 5 for performing signal processing such as readout of the image signal and amplification processing, and output of this imaging circuit 5 is connected to an analog to digital (A/D) converter 7 that performs AD conversion of the image signal.

The A/D converter 7 is connected to a data bus 10, and a RAM (Random Access Memory) 11, ROM (Read Only Memory) 13, ASIC (Application Specific Integrated Circuit) 15, system controller 20, drive controller 31, external I/F (interface) 37 and video encoder 41 are respectively connected to the data bus 10.

The RAM 11 is an electrically rewritable memory, and performs temporary storage of data. The ROM 13 is an electrically rewritable non-volatile memory, and stores programs and various adjustment values etc. for carrying out control of the digital single lens reflex camera.

The ASIC 15 is hardware for carrying out various processing such as image processing, JPEG compression and expansion processing, RAW compression and expansion processing etc., and is connected to the system controller 20. The compression processing by the ASIC 15 will be described later using FIG. 2. The system controller 20 is constituted by a CPU (Central Processing unit) for example, and performs overall control of the digital single lens reflex camera in accordance with programs stored in the ROM 13.

The system controller 20 is connected to a lens drive control circuit 21, a strobe emission section 23, an operating section 25 and a power supply section 27, and performs control of these circuits etc. The lens drive control circuit 21 performs drive control for the lens drive section 9, and performs focal length and focusing operations of the zoom lens system 1. The strobe emission section 23 projects illuminating light towards the subject in accordance with control signals from the system controller 20.

The operating section 25 includes switches connecting to various operating sections, such as a power supply switch, a first release switch and a second release switch linked to a release button, an exposure mode switch, a menu switch, and an arrow key for allowing operation of a cursor etc., and various setting by the photographer and a release operation are detected.

The power supply section 27 supplies power required for operation of the digital single lens reflex camera, and includes a power supply battery and a voltage control circuit. Also, an external power supply input terminal 29 is provided in the power supply section 27 in order to receive supply of external power from a commercial power supply or a battery pack etc.

A drive controller 31 is connected to the data bus 10, and a disk drive 33 is connected to this drive controller 31. A storage medium 35 can be loaded into the disk drive 33. This storage medium 35 is a medium for storing image data that has been subjected to image processing by the ASIC 15 etc., and storage control of the disk driver 33 is carried out by the drive controller 31.

An external interface 37 is connected to the data bus 10, and this external interface 37 is connected to an external input/output terminal 39. The external I/F 37 is an interface for performing interchange of image data and other data with an external device such as a personal computer (PC).

A video encoder 41 is also connected to the data bus 10, and video out 43 and an LCD (Liquid Crystal Display) driver 45 are connected to the video encoder 41. This video encoder 41 is a converter for converting to image data for display etc. based on image data stored in the RAM 11 or the storage medium 35, and here converted image data is externally output via video out 43, and displayed on the LCD 47 by the LCD driver 45.

An LCD 47 is located on the rear surface of the digital single lens reflex camera, and performs display of a subject image stored in the RAM 11 or storage medium 35, as well as display of the various exposure mode and control values that have been set using the operating section 25.

Figure 2:
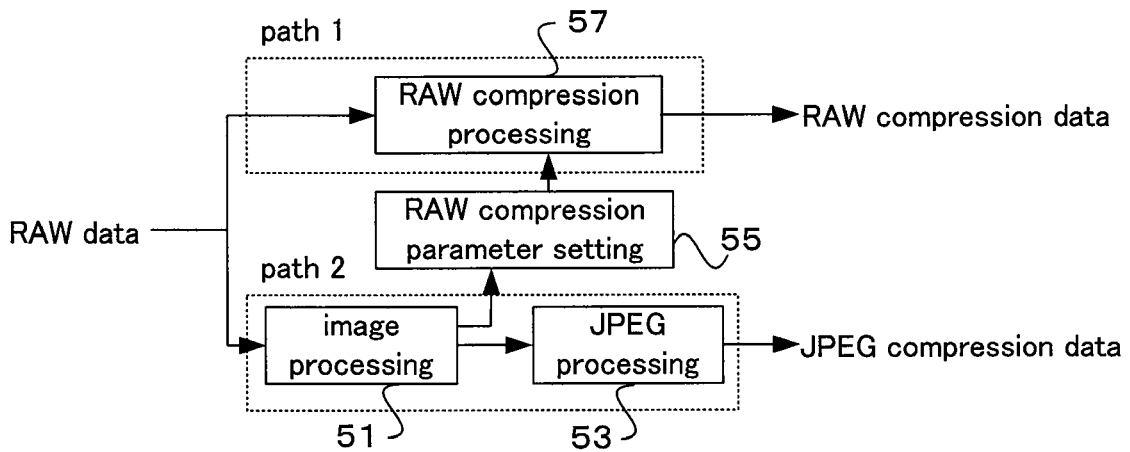
FIG. 2 is a block diagram relating to compression processing inside an ASIC relating to one embodiment of the present invention.

Next, RAW compression and JPEG compression that take place inside the ASIC 15 will be described using FIG. 2. Image signals output from the image sensor 3 are converted to digital format RAW data (image data) by the A/D converter 7, and input via the data bus 10 to the ASIC 15. The block for compression shown in FIG. 2 is comprised of a path 1 for carrying out RAW compression processing and a path 2 for carrying out JPEG compression processing.

The RAW data input section is connected to the image processing section 51 constituting the path 2, and output of the image processing section 51 is connected to a RAW compression parameter setting section 55 and a JPEG processing section 53. The RAW data input section is also connected to a RAW compression processing section 57 constituting the path 1, and output of the RAW compression parameter setting section 55 is connected to the RAW compression processing section 57.

The image processing section 51 is a hardware circuit that performs processing by detecting high frequency components of an image, and performs calculation of feature parameters etc. to represent appearance frequency distribution for high frequency components. Specifically, in the image processing section 51, difference values for image data between adjacent pixels are obtained as high frequency components, and appearance frequency distribution is obtained as feature parameters. Detailed operation of the image processing section 51 will be described later using FIG. 4.

The JPEG processing section 53 is a circuit for subjecting image data to compression processing using the well-known JPEG format. The RAW compression parameter setting section 55 is a circuit for setting compression parameters at the time of RAW compression, based on feature parameters calculated in the image processing section 51, and detailed operation will be described later using FIG. 5. The RAW compression processing section 57 is a circuit for subjecting the input RAW data to lossless compression processing, and the compression processing is performed using compression parameters that have been set by the RAW compression parameter setting section 55.

JPEG compression data is output from the above-described JPEG processing section 53 of path 2, and RAW compression data is output from the RAW compression processing section 57 of path 1. Specifically, using the circuit shown in FIG. 2, RAW data based on output of the image sensor 3 is subjected to lossy compression and output as JPEG compression data, and subjected to lossless compression and output as RAW compression data.

Figure 3:
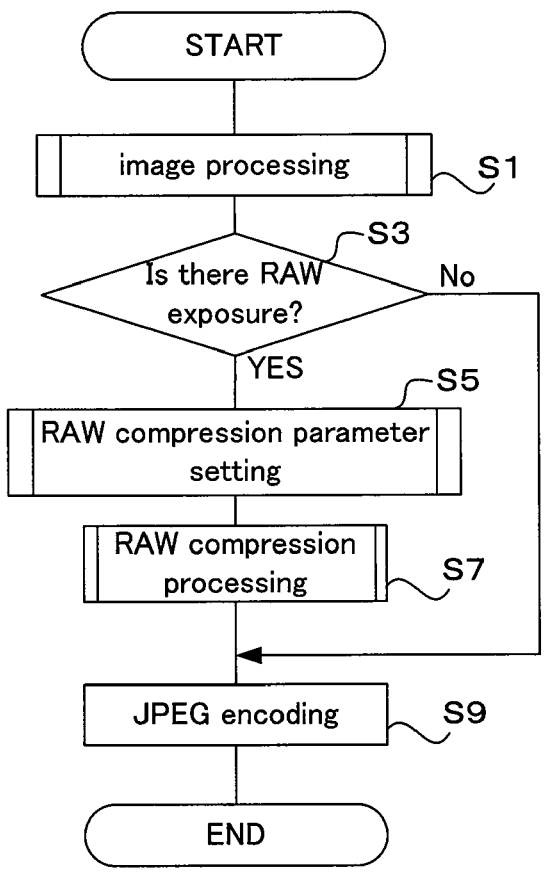
FIG. 3 is a diagram showing the flow of image compression processing relating to one embodiment of the present invention.

Next, operation of the circuit for carrying out the compression processing inside the ASIC 15 shown in FIG. 2 will be described using FIG. 3 to FIG. 7. FIG. 3 shows overall operation of compression processing, with this processing flow being controlled by the system controller 20, and individual processes being executed by individual blocks within the ASIC 15.

If the processing for image compression shown in FIG. 3 is started, the system controller 20 instructs execution of image processing to the image processing section 51 inside the ASIC 15 (S1). Image processing here is carrying out of feature parameter setting etc., and the detailed operation will be described later using FIG. 4.

Next, it is determined whether or not there is RAW exposure (S3). With the digital single lens reflex camera relating to this embodiment image data of a taken image is stored in the storage medium 35 after having been subjected to JPEG compression, but it is possible to also store together with RAW compression data by the photographer operating the menu mode etc. In step S3, determination is carried out as to whether or not setting for this RAW compression data storage has taken place.

If the result of this determination in step S3 is that there is RAW exposure mode, setting of RAW compression parameters is carried out in the RAW compression data parameter setting section 55 (S5). This RAW compression parameter setting is carried out using the feature parameters obtained in step S1. Details will be described later using FIG. 5.

If the parameter setting is completed, then RAW compression processing is carried out in the RAW compression processing section 57 (S7). This RAW compression processing will be described in detail later using FIG. 6.

If the result of determination in step S3 is that RAW exposure is not carried out, or if the RAW compression processing of step S7 is completed, JPEG encoding is then carried out (S9). This is carrying out lossy compression processing using the well-known JPEG format in the JPEG processing section 53.

In this way, in this embodiment image processing such as obtaining feature parameters is carried out, (S1), and in the case where there is no RAW exposure JPEG encoding is carried out immediately (S3→No→S9). On the other hand, in the case of RAW exposure, JPEG encoding is also carried out (S9) together with RAW compression processing using RAW compression parameters using feature parameters obtained in the image processing (S3→S5→S7).

Figure 4:
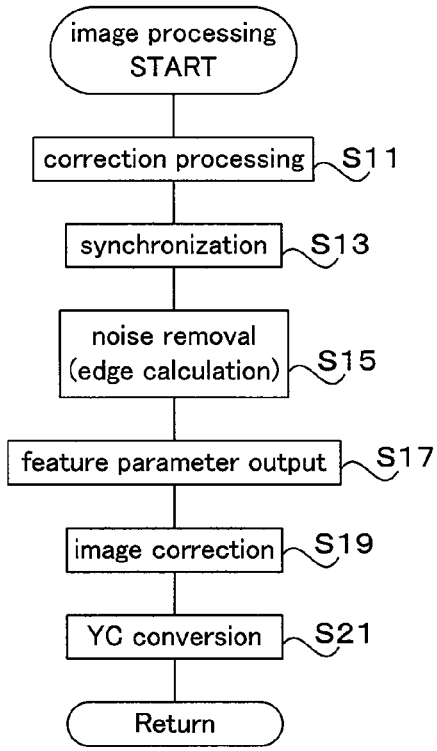
FIG. 4 is a diagram showing the flow of image processing relating to one embodiment of the present invention.

Next, the image processing of step S1 will be described using the flow shown in FIG. 4. The flow of this image processing is handled in a hardware fashion in the image processing section 51, but it is also possible to handle using software using the CPU of the system controller 20 etc.

In the image processing section 51, first of all correction processing is carried out for the image data (S11). As correction processing, correction processing for white balance and optical black etc. is carried out. Synchronization processing is then carried out (S13). The image sensor 3 has RGB fundamental color filters arranged in a Bayer pattern, and so RGB values for each pixel are obtained by interpolation.

If the synchronization processing is completed, noise removal is then carried out (S15). If ISO sensitivity is made high, random noise is increased, and so removal of this random noise is carried out based on difference values of signals of each pixel. If noise removal is carried out based on the difference values, image edge sections may be erroneously corrected, and so noise removal is not carried out for edge sections If noise removal is completed, this is followed by feature parameter calculation and output (S17). The feature parameter represents distribution of frequency of appearance of high frequency components, the high frequency components being obtained based on difference values of image data in step S15, and is information entropy.

Specifically, when a parameter representing size of a high frequency component is made i, and appearance frequency corresponding to this parameter i is made Pi, the feature parameter is calculated using $$-\Sigma Pi \cdot \mathrm{Log}\, Pi$$

If feature parameter output is completed, image correction is then carried out (S19). Image correction is carrying out correction such as color reproducibility and gradation expression for image data. If image correction is completed, it is followed by YC conversion so as to give a YC signal comprised of brightness and color information (S21). Processing in each step from step S1 to step S19 is performing of processing for RGB pixel output based on a Bayer array, but in this step JPEG compression and conversion is carried out to YC data that can be easily displayed on an LCD 47.

Figure 5:
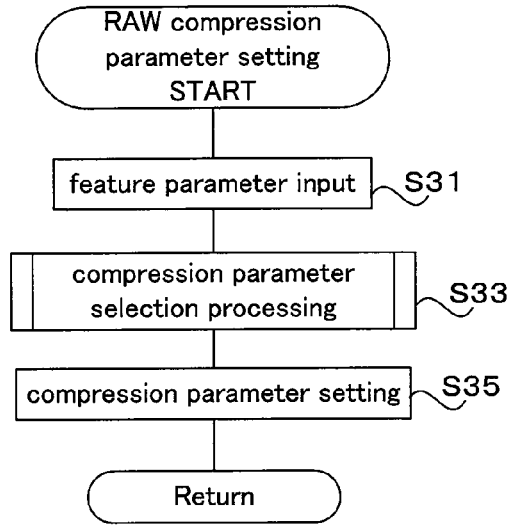
FIG. 5 is a diagram showing the flow of RAW compression parameter setting relating to one embodiment of the present invention.

Next, the previously described RAW compression parameter setting of step S5 will be described using FIG. 5. This RAW compression parameter setting is handled in hardware by the RAW compression parameter setting section 55, but it is also possible to handle using software using the CPU of the system controller 20 etc.

If RAW compression parameter setting is entered, first of all input of a feature parameter is carried out (S31). A feature parameter is calculated by the image processing section 51 in previously described step S17, and this feature parameter is input to the RAW compression parameter setting section 55.

Next, compression parameter selection processing is carried out using the input feature parameter. Details will be described in FIG. 6. After that, setting of the compression parameter selected in step S33 is carried out (S35).

Figures 8, 9:
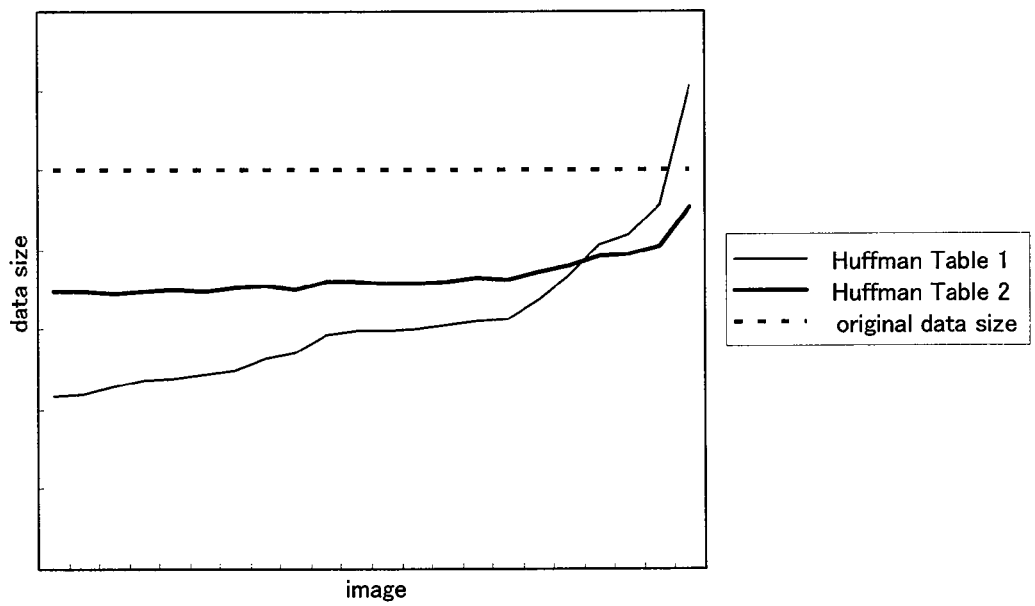
FIG. 8 is a diagram showing a table used at the time of Huffman coding relating to one embodiment of the present invention.
FIG. 9 is a diagram showing data size at the time of using a Huffman table 1 and a Huffman table 2 relating to one embodiment of the present invention.

Next, description will be given of the compression parameter selection processing of step 33, but before that the compression parameters of this embodiment will be described. In this embodiment, RAW compression parameters use a Huffman table such as shown in FIG. 8. There are two categories of Huffman table 1 and Huffman table 2 in the Huffman table, and either Huffman table is selected based on the feature parameter.

Here, the Huffman table 1 is used in the event that correlation in adjacent pixel output is strong, as with a natural image. On the other hand, the Huffman table 2 is a table used in the event that pixel output varies steeply, as with an artificial image like a so-called snowstorm on a television screen, or an image that has been taken of fine lace with a black background.

FIG. 9 is a graph of a case of RAW conversion, using Huffman table 1, of an image that has been taken with a digital camera, in data size order. In FIG. 9, data size for an image compressed using Huffman table 2 is also shown together, for the same image.

As will be understood from FIG. 9, while the data size of the image compressed with Huffman table 1 is small, it is smaller than the data size of the image compressed with Huffman table 2, but moving to the right side of the graph there is a region where the data size of the image compressed using Huffman table 2 becomes smaller.

Figures 10, 11, 12:
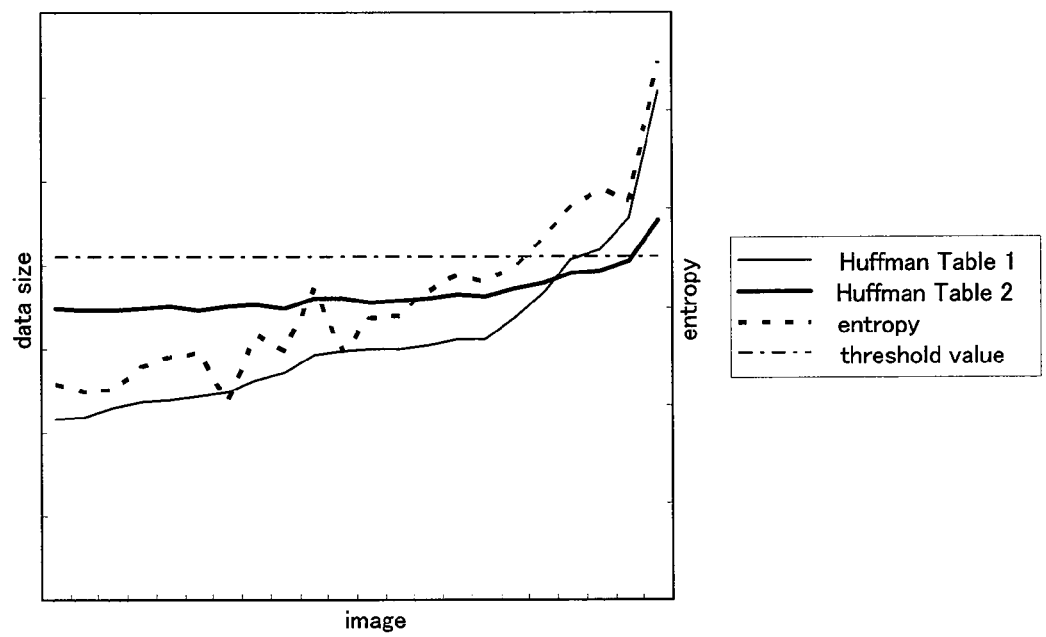
FIG. 10 is a diagram showing a relationship between entropy and threshold values at the time of using a Huffman table 1 and a Huffman table 2 relating to one embodiment of the present invention.
FIG. 11 is a diagram showing a modified example of a high frequency filter relating to one embodiment of the present invention.
FIG. 12 is a diagram showing another modified example of a high frequency filter relating to one embodiment of the present invention.

Entropy representing information amount is superimposed on FIG. 9, and is shown in FIG. 10. In the vicinity of the reversal of the relationship between data sizes of images compressed with Huffman table 1 and Huffman table 2, a threshold value is set so as to intersect entropy. This threshold value is set so that the data size of the image compressed with Huffman table 1 can be prevented from exceeding the size of the original image. Whether the compressed image exceeds the size of the original image is different depending on the image, and the threshold value is set targeting a particular level of safety.

Figure 6:
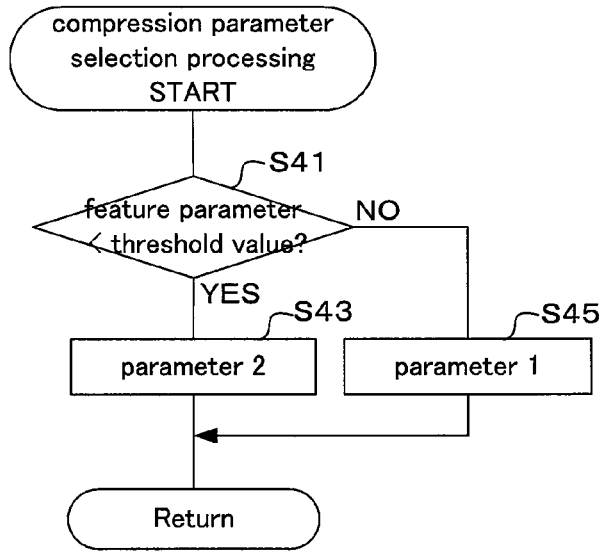
FIG. 6 is a diagram showing the flow of compression parameter selection processing relating to one embodiment of the present invention.

In the flow of compression parameter selection processing shown in FIG. 6, first of all comparison of a feature parameter with the threshold value described using FIG. 10 is carried out (S41). If the result of comparison is that the feature parameter is smaller than the threshold value, a parameter 1, namely Huffman table 1, is selected (S45). If, on the other hand, the result of comparison is that the feature parameter is larger than the threshold value, a parameter 2, namely Huffman table 2, is selected (S43).

Figure 7:
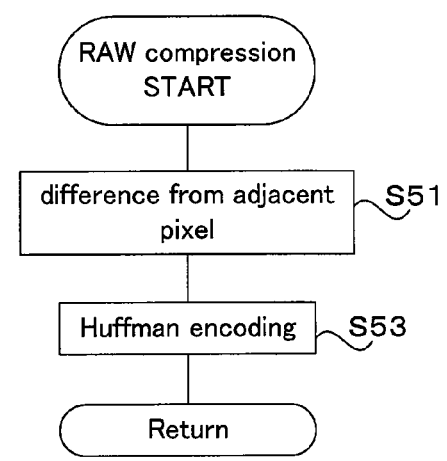
FIG. 7 is a diagram showing the flow of RAW compression relating to one embodiment of the present invention.

Next, the RAW compression of step S7 (FIG. 3) will be described using the flow shown in FIG. 7. This processing is handled in hardware in the RAW compression processing section 57, but it is also possible to handle using software using the CPU of the system controller 20 etc.

Differences between adjacent pixels are first obtained by the RAW compression processing section 57 (S51). This is the performing of difference calculation between pixel data based on input RAW data. Next, Huffman encoding is carried out for the obtained adjacent pixel differences (S53). Execution of this Huffman encoding uses parameters set in step S43 or step S45, In this way, in the compression parameter selection processing an optimum table is selected that is used in Huffman encoding in accordance with size of a feature parameter representing information entropy. Then, at the time of RAW compression a selected Huffman table is being used, which means that it is possible to prevent the result of RAW compression being a data size that is larger than the size of the original image data.

Also, since the Huffman table is selected according to the feature parameter, at the point in time where it is clear that the image data size will become large, processing is not performed again, as was shown in patent document 1. For this reason, it is possible to shorten the time taken for RAW compression.

Next, a modified example of a high frequency filter for carrying out extraction of high frequency components will be described using FIG. 11 and FIG. 12. In this embodiment, a digital high frequency filter is obtained by difference values of adjacent pixels at the time of noise removal in step S15, at the time of calculation of the feature parameter of step S17, and at the time of RAW compression in step S51. Extraction of high frequency components, as well as being obtain from difference values of adjacent pixels, can be achieved with various methods, as shown in the modified example.

The high frequency filter shown in FIG. 11 quadruples the image data of the center pixel, and subtracts data values of pixel data to the left and right, and front and back, from this quadrupled pixel. Also, the high frequency filter shown in FIG. 12 adds values of pixel data to the right and below the central pixel, and subtracts values of pixel data to the left and above the central pixel from this value. Any digital filter to extract this type of high frequency component can be used instead.

As has been described above, with this embodiment it is possible to determine compression parameters at the time of compression of RAW data or the like based on image information at the time of creating JPEG images etc. for reproduction (executed in the image processing section 51). As a result of this, it is possible to prevent the data size of the compressed image data becoming a specified size without extending the time required for compression processing.

Specifically, with this embodiment, since a parameter (Huffman table) used at the time of RAW compression is determined using feature data being executed at a stage prior to the compression processing using JPEG or the like, it is not necessary to repeatedly carry out compression processing until a specified size is obtained.

With this embodiment, description has been given with the JPEG system as lossy compression processing for image data, but this is not limiting as long as the compression method calculates feature data at a prior stage. Also, Huffman encoding has been used in the compression processing but this is not limiting, and it is possible to use other entropy encoding.

Further, with the flow shown in FIG. 3, after RAW compression has been carried out JPEG encoding is performed, but it is also possible to carry out both forms of compression at the same time in parallel. Also with this embodiment, information entropy has been used as feature data representing frequency of appearance of high frequency components, but this is not limiting and it is also possible to use, for example, values representing dispersion.

The present invention is not limited to a digital single lens reflex camera, and can also be applied, for example, to a digital camera such as a compact digital camera, and can also be applied to a camera built into a mobile telephone or mobile information terminal (PDA: Personal Digital Assistant), and further, it goes without saying that the present invention can also be applied to a camera capable of being attached to a dedicated device, such as a photo booth for a microscope. In any event, the present invention can be applied to a camera, an electronic image-taking device, or an image processing unit for executing image data compression.

What is claimed is:

1. An image data compression device, comprising:
   a lossy compression processing section configured for performing lossy compression of image data;
   an image processing section, arranged between an image data input section for inputting the image data and the lossy compression processing section, configured for detecting high frequency components of an image by processing the image data for the lossy compression processing;
   a calculation section for calculating feature data representing distribution of frequency of appearance of the high frequency components;
   a compression parameter setting section configured for selecting and setting previously determined parameters for lossless compression based on the feature data; and
   a lossless compression processing section configured for receiving input of the image data and the compression parameters and performing lossless compression processing.

2. The image data compression device of claim 1, wherein:
   the lossy compression processing is JPEG compression.

3. The image data compression device of claim 1, wherein:
   the lossless compression is RAW compression.

4. The image data compression device of claim 1, wherein:
   the feature data are data representing information entropy.

5. The image data compression device of claim 1, wherein:
   the compression parameters are a Huffman table.

6. An image data compression method, comprising:
   performing lossy compression of image data in a lossy compression processing section;
   inputting the image data, and detecting high frequency components of an image by processing the image data for the lossy compression processing;
   calculating feature data representing distribution of frequency of appearance of the high frequency components;
   selecting and setting previously determined compression parameters for lossless compression based on the feature data; and
   receiving input of the image data and the parameters, and performing lossless compression processing.

7. A non-transitory computer readable medium, storing an image data compression program for execution on a computer, the image data compression program comprising:
   performing lossy compression of image data in a lossy compression processing section;
   inputting the image data, and detecting high frequency components of an image by processing the image data for the lossy compression processing;
   calculating feature data representing distribution of frequency of appearance of the high frequency components;
   selecting and setting previously determined compression parameters for lossless compression processing based on the feature data; and
   receiving input of the image data and the compression parameters, and performing the lossless compression processing.

* * * * *